US010482690B2

(12) United States Patent
Jordan

(10) Patent No.: US 10,482,690 B2
(45) Date of Patent: Nov. 19, 2019

(54) METHOD, SYSTEM AND APPARATUS FOR MONITORING, ANALYZING, AND REPORTING USAGE OF AIRCRAFT AUXILIARY POWER UNITS (APUS)

(71) Applicant: APUTRAC, Atlanta, GA (US)

(72) Inventor: Patric Jordan, Atlanta, GA (US)

(73) Assignee: APUTRAC, Atlanta, GA (US)

( * ) Notice: Subject to any disclaimer, the term of this patent is extended or adjusted under 35 U.S.C. 154(b) by 180 days.

(21) Appl. No.: 15/698,039

(22) Filed: Sep. 7, 2017

(65) Prior Publication Data

US 2019/0019354 A1   Jan. 17, 2019

Related U.S. Application Data

(60) Provisional application No. 62/384,993, filed on Sep. 8, 2016.

(51) Int. Cl.
| | | |
|---|---|---|
| *G07C 5/08* | (2006.01) | |
| *G08G 5/00* | (2006.01) | |
| *G01F 23/00* | (2006.01) | |
| *B64D 33/00* | (2006.01) | |

(52) U.S. Cl.
CPC ............ *G07C 5/085* (2013.01); *B64D 33/00* (2013.01); *G01F 23/0076* (2013.01); *G08G 5/0013* (2013.01); *G08G 5/0021* (2013.01); *G08G 5/0052* (2013.01)

(58) Field of Classification Search
CPC ................................................... G07C 5/085
See application file for complete search history.

(56) References Cited

U.S. PATENT DOCUMENTS

| | | | | |
|---|---|---|---|---|
| 6,631,384 B1* | 10/2003 | Richman | ............. | G06F 16/2477 |
| 6,859,688 B1* | 2/2005 | Orf | ........................ | G01C 25/00 |
| | | | | 701/14 |
| 7,960,857 B2* | 6/2011 | King | ...................... | B60L 58/40 |
| | | | | 307/10.1 |
| 8,229,622 B2* | 7/2012 | Payne | ...................... | B64F 5/60 |
| | | | | 701/33.4 |
| 2004/0260777 A1* | 12/2004 | Kolb | ..................... | G07C 5/008 |
| | | | | 709/206 |

(Continued)

*Primary Examiner* — Alex C Dunn
(74) *Attorney, Agent, or Firm* — Russell Ng PLLC; Brian F. Russell

(57) ABSTRACT

An on-aircraft recording device includes an interface that receives APU usage data from an aircraft auxiliary power unit (APU) independently of a flight data recorder and data acquisition unit. The on-aircraft recording device can be communicatively coupled (e.g., wirelessly) to a data acquisition service (DAS) system that communicates APU ground-run usage data received from a plurality of on-ground aircraft to a data management center (DMC) utilizing a plurality of unique callback identifiers. The DMC can include a DMC APU ground-run data structure for storing APU ground-run usage data and a processor configured to receive APU ground-run usage data for a plurality of on-ground aircraft, record, in the DMC APU ground-run data structure, the APU ground-run usage data for the plurality of on-ground aircraft, detect if the APU ground-run usage data satisfies an APU usage threshold, and electronically communicate, via a communication network, an alert indicating potentially excessive APU use.

12 Claims, 5 Drawing Sheets

(56) References Cited

U.S. PATENT DOCUMENTS

| | | | |
|---|---|---|---|
| 2008/0039997 A1* | 2/2008 | Kolb | G07C 5/085 701/33.4 |
| 2008/0279675 A1* | 11/2008 | Ullyott | F01D 21/06 415/1 |
| 2009/0319100 A1* | 12/2009 | Kale | G08G 5/0013 701/4 |
| 2010/0293961 A1* | 11/2010 | Tong | F01D 19/00 60/778 |
| 2012/0191273 A1* | 7/2012 | Jacobs | H04B 7/18508 701/3 |
| 2012/0191332 A1* | 7/2012 | Sawhill | G08G 5/0013 701/120 |
| 2013/0200209 A1* | 8/2013 | Goldman | B64C 25/405 244/50 |
| 2015/0251770 A1* | 9/2015 | Bisson | B64D 31/06 244/58 |
| 2015/0279218 A1* | 10/2015 | Irrgang | G08G 5/0039 701/3 |
| 2016/0090915 A1* | 3/2016 | Wolff | B64D 41/00 60/794 |
| 2017/0291715 A1* | 10/2017 | Jayathirtha | B64D 45/00 |
| 2017/0335711 A1* | 11/2017 | Marcus | B64D 27/10 |

* cited by examiner

US 10,482,690 B2

METHOD, SYSTEM AND APPARATUS FOR MONITORING, ANALYZING, AND REPORTING USAGE OF AIRCRAFT AUXILIARY POWER UNITS (APUS)

BACKGROUND

Modern commercial and military aircraft are equipped with auxiliary power units (APUs) that provide power to operate non-propulsion systems and to start the main/propulsion engines. For example, APUs are commonly used to provide aircraft with electrical power for operating aircraft avionics and lighting, and with pneumatic pressure for cabin cooling/heating systems and for starting the main/propulsion engines. As such, APUs are regularly run before takeoff and after landing, and sometimes during flight.

Aircraft APUs burn significant amounts of jet fuel during use, generally between 40 and 100 gallons per hour of use, depending on the type of unit. Recent studies by the airline industry and military aircraft operators have shown that APUs are operated regularly and routinely even when they are not needed. Because of the high cost of jet fuel, typical operation of APUs is thus very and unnecessarily expensive. In addition, most older aircraft types do not have the ability to monitor APU use, and newer aircraft types are unable to record or transmit APU usage data when the on-aircraft avionics bus is turned off, which is when much of the inappropriate APU use occurs. Thus, actual APU use cannot be easily determined.

Consequently, APU maintenance intervals are often approximated based on aircraft hours of use. But over time the estimated APU usage can vary significantly from the actual usage. As a result, aircraft APUs are sometimes maintained too frequently, resulting in unnecessary expenses, and sometimes not maintained often enough, which can result in APU damage or failure.

Accordingly, there exists a need for improvements that facilitate more efficient use and maintenance of aircraft APUs. It is to the provision of solutions to this and other problems that the present invention is primarily directed.

SUMMARY

In at least one embodiment, an aircraft may include a data acquisition unit, a flight data recorder, one or more propulsion engines, and an auxiliary power unit (APU). An on-aircraft recording device for use with such an aircraft may include a first interface that receives a flight dataset including APU usage data from the flight data recorder or the data acquisition unit and a second interface that receives a ground dataset including APU usage data from the APU independently of the flight data recorder and data acquisition unit. The on-aircraft recording device may further include a storage device and a processor. The processor is coupled to the data storage and configured to record the APU usage data received from the APU via the second interface on the storage device.

In at least one embodiment, a data acquisition service (DAS) system includes data storage including a DAS aircraft data structure and a processor coupled to the data storage. The processor is configured to record, in the DAS aircraft data structure, identifiers of a plurality of on-ground aircraft for which APU ground-run usage data is authorized to be forwarded to a data management center (DMC), update the DAS aircraft data structure to associate a respective one of a plurality of unique callback identifiers with each of the plurality of identifiers, and communicate APU ground-run usage data received from the plurality of on-ground aircraft to a data management center (DMC) utilizing the plurality of unique callback identifiers.

In at least one embodiment, a data management center (DMC) includes data storage including a DMC auxiliary power unit (APU) ground-run data structure for storing APU ground-run usage data and a processor coupled to the data storage. The processor is configured to receive APU ground-run usage data for a plurality of on-ground aircraft, record, in the DMC APU ground-run data structure, the APU ground-run usage data for the plurality of on-ground aircraft, detect if the APU ground-run usage data satisfies an APU usage threshold, electronically communicate, via a communication network, an alert indicating potentially excessive APU use.

Other embodiments can implement the described functionality as a method (process) or program product. If implemented as a program product, an embodiment can include a storage device and instructions stored on the storage device that, when executed by a processor, cause the processor to perform steps providing the described functionality.

DESCRIPTION OF EXAMPLE EMBODIMENTS

Figure 1:
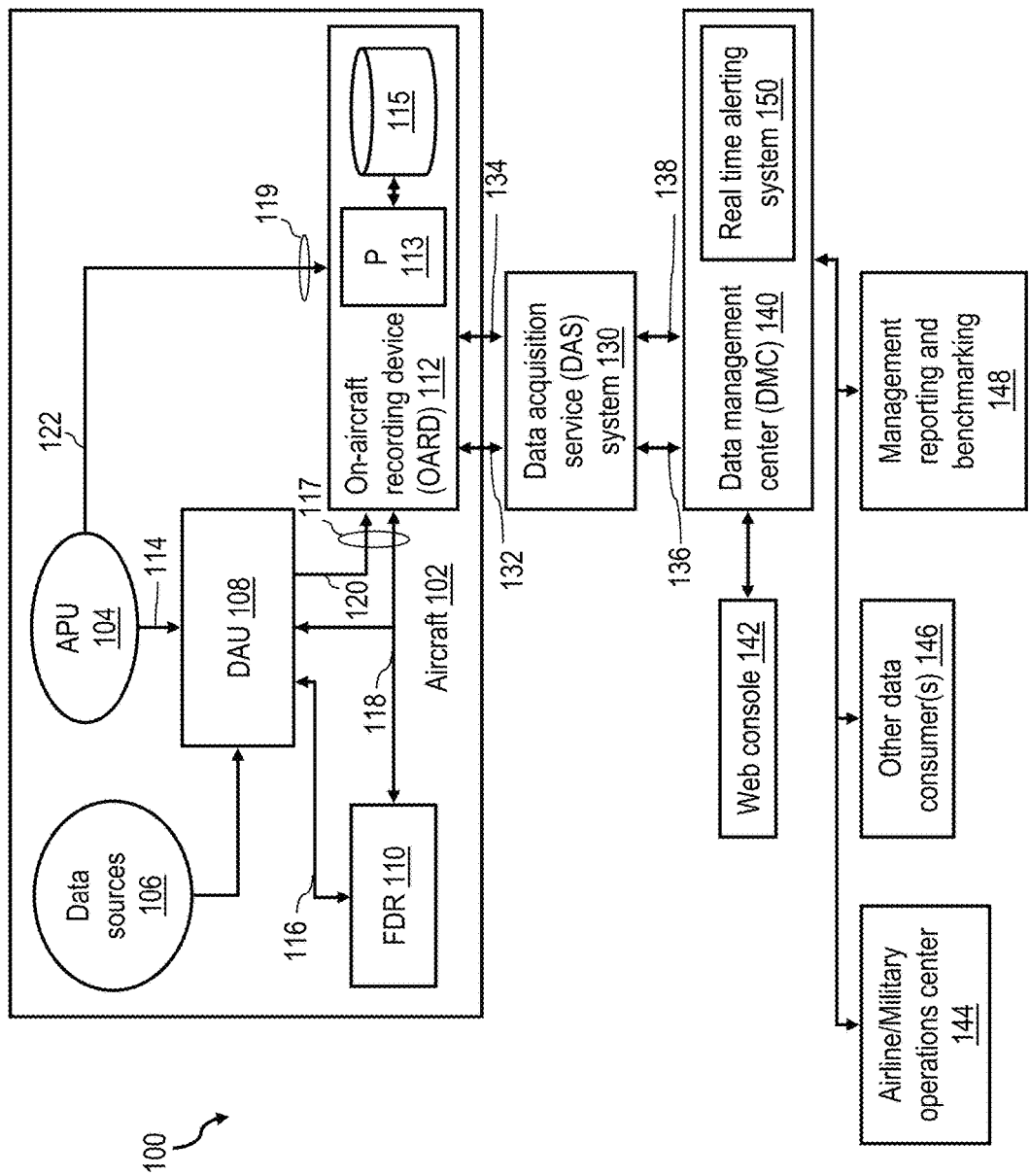
FIG. 1 is a block diagram of an APU monitoring, analyzing, and reporting system according to an example embodiment of the invention.

The disclosed inventions relate to methods, systems, and apparatus for monitoring, analyzing, and reporting usage of auxiliary power units (APUs) on aircraft. Generally described, the inventive methods, systems, and apparatus are for providing data, management reports and real-time alerting to airline operator decision-makers to support the refinement and enforcement of aircraft APU usage policies and procedures, resulting in more efficient use of APUs. More efficient APU use will reduce APU fuel consumption and the associated costs and carbon footprint, reduce and/or enable more timely APU maintenance, and reduce APU failure and replacement expenses.

The disclosed methods, systems, and apparatus collect APU usage data via an onboard data recording device (e.g., an on-aircraft recording device (OARD) or Quick Access Recorder (QAR)) that communicates APU usage data to a data center for integration with other data sources such as supplemental location data, ambient temperature, and aircraft status (operational or maintenance). The combined data are stored, analyzed, and reported, thus providing real-time alert messages, summary reports, and/or APU run data to authorized airline and military operation centers and personnel.

Capture of APU run data is enabled by an appropriately configured on-aircraft data recording device (e.g., OARD or QAR) and modified APU communication. The OARD/QAR is able to power on and remain on while the APU is running, enabling APU usage data to be captured even when the aircraft main engines are off. The APU is communicatively coupled to the on-aircraft data recording device by a communication link (e.g., wiring) independently of the aircraft's avionics bus and data acquisition unit.

A Data Acquisition Service (DAS) system monitors the aircraft APU usage using specialized processes (e.g., implemented in software, firmware, hardware (i.e., integrated and/or discrete circuitry) and/or a combination) to determine when an APU is operating. The DAS system monitors, records, and reports the APU usage on/off times and operating durations. The DAS system may also collect and report locations of APU operation, aircraft operational state, APU operating parameters, such as fuel flow, exhaust gas temperature (EGT), air conditioning pack status, and cabin temperature data.

In a typical use scenario, the DAS system transmits collected data to a Data Management Center (DMC) periodically based on business rules communicated to and stored in the DAS system. These rules may consider many factors, including but not limited to, motion state, aircraft location, cabin temperature, OARD installation state, aircraft operational state, time interval since the last report, communication network availability, report type (standard or alert), and APU operations. These factors can be used to determine when to transmit data to the DMC for analysis and which communication network to use to communicate the data.

The DMC provides regular reports and timely alerts to authorized customer designees. In particular, the DMC provides a unique real-time alerting process by which the APU on commercial and military aircraft can be managed while the aircraft is on the ground. Based on user-established (or default) APU usage thresholds, the DMC informs the appropriate aircraft operator personnel in real time of excessive usage of the APU. The informed personnel can then respond to the alert with an explanation as to why the APU is still running and may or may not take any additional action (including having the APU turned off). The DMC then records responses and provides reports of the APU usage and alert responses to authorized personnel.

In brief, the alerting process can include: receiving APU status from a sensing device sufficient to know aircraft, aircraft location, and APU usage; sending an alert notification of APU usage in excess of user-established thresholds; receiving and retaining a user response to the notification; and generating reports of APU usage and user explanations. In this way, the responses to the real-time alerts are captured and reported, providing airline operators with reasons for potential inappropriate or excessive use of the APU. Responses to the real-time alerts can then be analyzed to determine the proximate causes of inappropriate APU use as a basis for corrective action(s) by the aircraft operator.

Turning now to the drawings, FIG. 1 shows an example embodiment of an APU monitoring, analyzing, and reporting system 100. The depicted system components and configuration are representative for illustration purposes only, and persons of ordinary skill in the art will understand how to adapt them for capturing APU use data depending on the specific aircraft type, aircraft recording device type/configuration, and available aircraft communications systems.

System 100 includes and/or is used with new or existing equipment on an aircraft 102 equipped with one or more propulsion engines and an APU 104. In addition to APU 104, aircraft 102 includes other data sources 106, a data acquisition unit (DAU) 108 such as a conventional digital flight data acquisition unit (DFDAU), a flight data recorder (FDR) 110 (colloquially referred to as a "black box"), and an on-aircraft data recording device such as an on-aircraft recording device (OARD) 112 (also referred to in the art as a quick-access recorder (QAR)). Data sources 106, DAU 108 and its data processing methods, and FDR 110 can all be of a conventional type well known in the art. OARD 112, which is not conventional, includes a processor 113, which as discussed further below, is configured in hardware, firmware, software and/or a combination thereof to record data on a storage device 115 (which preferably includes non-volatile storage and may additionally include volatile storage).

DAU 108 receives aircraft-related data from APU 104 and the other data sources 106. Data 114 that DAU 108 receives from APU 104 represents or can be processed to determine the operating state of APU 104 ("on" or "off") when DAU 108 is turned on and operating. APU data 114 thus relates to the usage or run time of the APU 104. For example, APU data 114 can indicate the APU operating state over time (from which the used time can be determined), the APU usage or run time itself, or other data related to the usage or run time of APU 104. In various embodiments, APU data 114 may originate in any of a variety of different Aeronautical Radio, Inc. (ARINC) formats as determined by the make and model of APU 104 and the configuration of DAU 108.

Data sources 106 can include conventional components such as clocks, GPS units, flow meters, temperature sensors, and the like, for providing data such as date/time (e.g., GMT), aircraft position, aircraft out/off/on/in times (in order to track APU operations during each phase of flight: taxi-out, take-off, landing, and taxi-in), APU fuel flow, pack ON/OFF (as an alternative to approximating APU fuel flow if fuel flow is not available), cabin temperature, and external power availability. These data elements, in addition to airline and aircraft indicia such as an airline designator (e.g., two-letter code) and aircraft ID (e.g., tail number), are referred to herein as the flight dataset. In other embodiments, the flight dataset includes alternative or additional data elements related to the airline, the aircraft, and in-flight conditions or data.

DAU 108 processes and filters the raw data received from APU 104 and the other data sources 106. For example, APU data 114 can be processed to determine the operational state and/or run time of APU 104. The DAU 108 then sends the processed data 116 to FDR 110. As shown at reference numeral 118, data 116 received by FDR 110 is played back (e.g., in an A717 protocol) to DAU 108 as a data verification check and, in parallel, is sent to OARD 112. In some aircraft, an auxiliary feed 120 interconnects and communicates some or all of the processed data from DAU 108 to OARD 112. OARD 112 receives the APU data from FDR 110 or DAU 108 via at least one first interface 117.

In accordance with one aspect of the invention, system 100 includes modification to conventional on-aircraft electronics architectures to include a communication link 122 by which APU 104 is communicatively coupled to send APU data from APU 104 to OARD 112 via a second interface 119. In at least some embodiments, communication link 122 can be implemented by direct wiring between the two components, for example, between an electronic controller of APU 104 and a data input of OARD 112; in other embodiments, communication link 122 can be wireless and/or indirect (operably coupled via an intermediary component other than DAU 108). Conventional APUs include a connection, terminal, or interface for outputting the APU data to a DAU, and communication link 122 can be supported by modifying the conventional APU design to include another connection point, terminal, or interface for outputting the APU data 114 to OARD 112. Conventional OARDs include a connection, terminal, or interface for receiving data from a FDR, and communication link 122 can be supported by modifying a conventional OARD design to include an additional connection, terminal, or interface for receiving APU data 114 from APU 104 independently of DAU 108 and FDR 110.

By communicatively coupling APU 104 and OARD 112 independently from DAU 108 and FDR 110, the APU operational status (on/off) and thus APU usage time can be received by OARD 112 regardless of the power state or configuration of the DAU 108 or FDR 110. This innovation enables the unique real-time alerting feature described below, regardless of the state of the aircraft engines. In contrast, conventional FDRs and OARDs are set to capture aircraft data only when the aircraft engines are running, and thus do not capture aircraft data (including APU data) when the aircraft is parked with the main engines off.

The data captured by OARD 112 generally forms two datasets referred to herein as a flight dataset, which includes flight-related data, and a ground dataset. The ground dataset may include, for example, airline designator (e.g., two-letter code), aircraft ID (e.g., tail number), date/time (GMT), APU off/on status (0/1), and aircraft position. In other embodiments, the ground dataset includes alternative or additional data elements related to the airline, the aircraft, and the on-ground conditions or data.

There are a few ways that OARD 112 can capture data elements of the ground dataset that are not received from APU 104. For example, in an example embodiment, the manufacturer of OARD 112 associates the hardware serial number of OARD 112 with an airline designator and aircraft ID, and this association is processed by a data acquisition service. Other ground dataset elements such as aircraft position can be provided by the other data sources 106 and are reported to OARD 112 by DAU 108.

As further illustrated in FIG. 1, system 100 includes and/or is used with a new or existing data acquisition center, such as a data acquisition service (DAS) system 130. DAS system 130, which can be located at or remote from an airport, includes data communications, data storage, and data processing components (e.g., a processor). In at least some implementations, these hardware components can be of a conventional type well known in the art. The storage device(s) within DAS system 130 provide storage for the flight dataset and the ground dataset, which as noted above include APU usage data.

In one preferred embodiment, OARD 112 employs wireless communication (e.g., cellular or Internet) to transmit the flight dataset 132 and the ground dataset 134 to DAS system 130. In this example, OARD 112 and DAS system 130 are cellular- or Internet-capable, and OARD 112 is programmed with the resource identifier(s) utilized to identify DAS system 130 on the communication network(s).

Flight dataset 132 contains select APU run time data and other data captured from DAU 108 as described herein. Flight dataset 132 is typically downloaded from OARD 112 to DAS system 130 on a defined schedule (e.g., daily, weekly, monthly, etc.), for example, as determined by the airline and the provider of DAS system 130, but typically after landing and when the aircraft is parked. The download of flight dataset 132 from OARD 112 to DAS system 130, and the storage of flight dataset 132 by DAS system 130, can be according to conventional practice.

Ground dataset 134 contains select APU run time data captured from DAU 108 as described herein. Ground dataset 134 is processed by OARD 112 using a unique process to determine changes in the APU run state and reporting intervals at which to transmit the data to DAS system 130. In an example embodiment, this reporting interval is typically set from about 30 to about 60 seconds, though other intervals can be used. In one preferred embodiment, ground dataset 134 is pre-processed by OARD 112 to packetize sampled APU run data and to reduce the overall size of ground dataset 134.

DAS system 130 is configured (e.g., in hardware, software, firmware, and/or a combination) to perform a number of processing tasks, including recognition of new data from OARD 112, restructuring of the data (e.g., for flight dataset 132), and determining whether or not to forward data to DMC 140. As described below, in at least one embodiment, DAS system 130 forwards to DMC 140 only select data (e.g., for particular aircraft and/or particular data types) authorized for release by the aircraft operator. As discussed below with reference to FIG. 2, in one embodiment, aircraft operator authorization is maintained in a unique data structure in DAS system 130 created by the hardware provider of OARD 112 as part of OARD hardware installation and/or configuration.

System 100 further includes a data management center (DMC) 140, which includes possibly conventional data communications, data storage, and data processing components (e.g., a processor and associated storage device(s)). DMC 140 receives from DAS system 130 a flight dataset 136 and ground dataset 138, which can have the same or different formats and/or content as datasets 132 and 134, respectively. DMC 140 and DAS system 130 can communicate via one or more wired and/or wireless communication networks (e.g., cellular or Internet). To facilitate communication of flight dataset 136 and ground dataset 138, DAS system 130 is preferably programmed with the resource identifier(s) utilized to identify DAS system 130 on the relevant communication network(s).

In at least one embodiment, DMC 140 maintains a DMC airline table in which APU usage data for aircraft having active/running APUs is recorded. DMC 140 periodically reviews the DMC airline table to identify those aircraft with active APUs whose usage satisfies one or more APU usage thresholds. In at least some embodiments, the APU usage thresholds are preferably for APU on-ground usage reported in ground dataset 138 only, and thus the comparison to the APU usage thresholds can be made based on only the APU on-ground usage. In other embodiments, one or more APU usage thresholds can be defined for cumulative APU usage including APU usage reported in flight dataset 132 and ground dataset 134. When an APU usage threshold is satisfied, a real-time alerting system 150 of DMC 140 provides an alert, as described in more detail below.

As indicated, DMC 140 preferably is configured to support communication with a customer interface, such as a web console 142, which can be for example, a data processing device (e.g., smart phone, tablet or computer system) executing a conventional web browser logged into a web server executing on DMC 140. Through web console 142, DMC 140 can provide various data input forms and APU maintenance and management tools. DMC 140 can also provide via web console 142 additional tools enabling an authorized user to generate and output management and benchmarking reports 148, to export data (including APU data) to one or more data consumers 146, and to communicate data and instructions to an airline/military operations center 144. Data consumers 146 can include, for example: airline operational databases storing data concerning the aircraft location, operational status, taxi and turn times (from aircraft block-in to block-out); external databases storing environmental data such as outside ambient temperatures; and/or airline operational databases storing data concerning the status of ground support equipment such as jet-way air conditioning and electrical power. Airline/military operations center 144 may store the APU data collected and analyzed by DMC 140 and/or may execute additional in-house or third-party software for APU management analysis and reporting.

Further, in accordance with one aspect of the disclosed inventions, using web console 142, an airline administrator can establish independent alerting thresholds for one or more APU usage hierarchies, for example: airline, region, station (e.g., airport), and fleet. These alerting thresholds configure the operation of the real time alerting system 150 of DMC 140, as described in more detail below.

Figure 2:
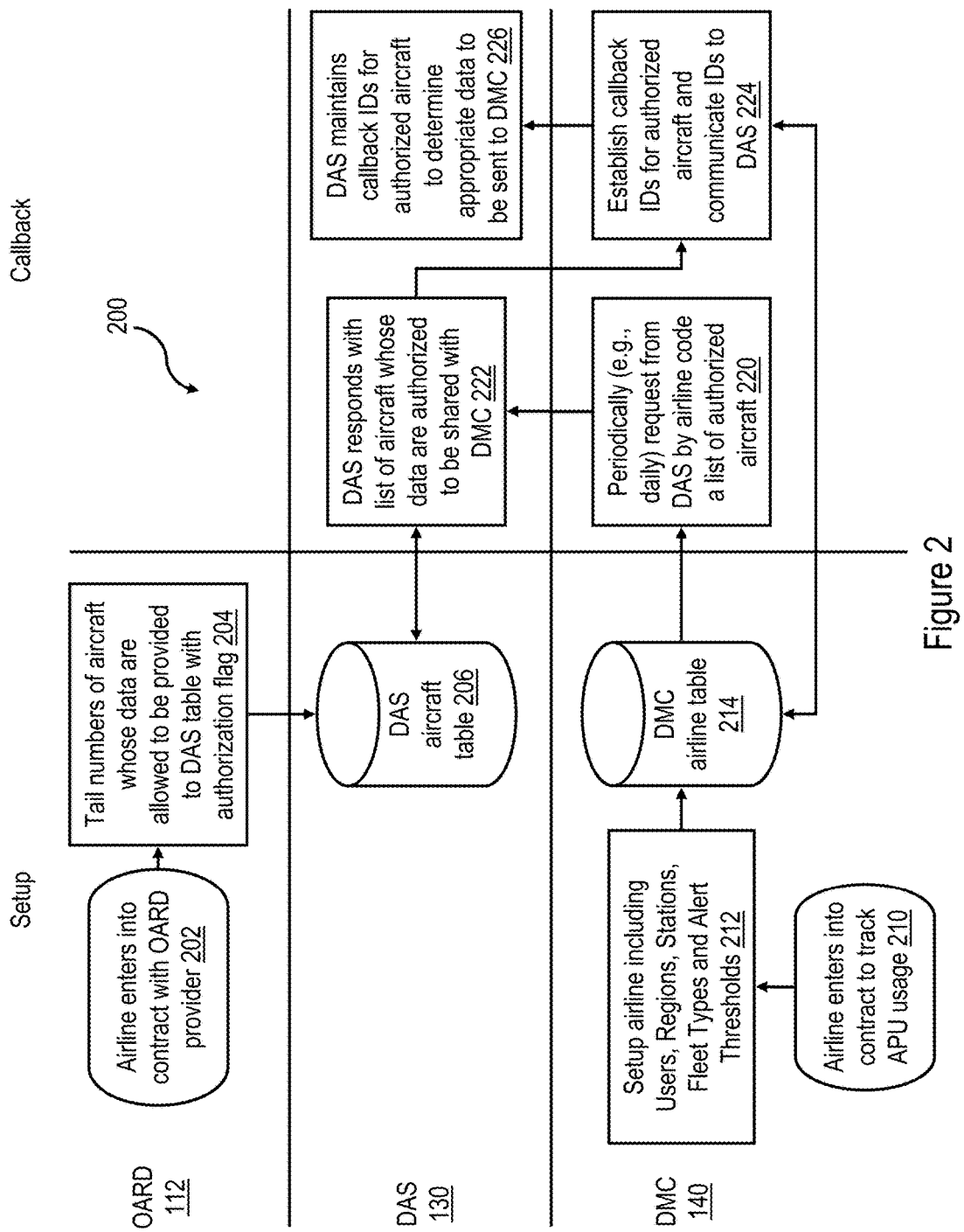
FIG. 2 is a flow diagram of a setup and call-back process according to an example embodiment of the invention.

Referring now to FIG. 2, a flow diagram of a setup and callback process 200 according to an example embodiment of the invention is illustrated. The setup portion of process 200 is illustrated at the left side of the figure utilizing reference numbers 202-214; the callback portion of process 200 is depicted on the right side of the figure utilizing reference numbers 220-226.

Referring first to block 202, one or more airlines enter into a contract with a hardware provider of OARD 112. Following block 202, the hardware provider of OARD 112 establishes an aircraft data structure, hereinafter referred to DAS aircraft table 206, in DAS system 130 (block 204). DAS aircraft table 206 contains records identifying aircraft whose data have been authorized by the airline(s) to be shared.

In addition, at block 210, the airline(s) enters into a contract with an operator of DMC 140, such as APUTrac, which in some cases may additionally operate DAS system 130. Following block 210, DMC 140 is configured to set up each airline, for example, to establish credentials for authorized users, to define geographic operating regions for reporting and alerting purposes, to define various aircraft stations (e.g., airports), to configure fleet types, and to set alert thresholds. Alternative or additional data can be set up within DMC 140; however, typically no aircraft tail numbers are entered into DMC 140 at block 212. As noted above, the airline can enter configuration data, for example, using web console 142 or another data processing system communicatively coupled to DMC 140. The configuration data entered at block 212 can be stored by DMC 140 in an airline configuration data structure, referred to hereinafter as DMC airline table 214.

Following the setup procedure, DMC 140 periodically (e.g., once daily) requests from DAS system 130, by airline International Civil Aviation Organization (ICAO) or International Air Transport Association (IATA) code, a list of authorized aircraft for which data can be shared with DMC 140 (block 220). As shown at block 222, DAS system 130 responds with a list of aircraft whose data have been authorized by an airline to be shared with the DMC 140. Next, at block 224, DMC 140 updates DMC airline table 214 with the list of aircraft received from DAS system 130 and establishes callback IDs for the authorized aircraft. DMC 140 communicates these callback IDs to DAS system 130, which maintains the callback IDs (e.g., in DAS aircraft table 206) for the authorized aircraft to determine appropriate data transmissions to DMC 140 (block 226).

In accordance with at least some embodiments, the data communicated from DAS system 130 to DMC 140 utilizing the callback procedure of FIG. 2 includes flight dataset 136. According to one implementation, DAS system 130 is configured (e.g., by hardware, software, firmware and/or a combination thereof) to detect a new flight dataset of an aircraft matching those identified as authorized in DAS aircraft table 206 and to push the detected flight dataset to DMC 140 utilizing the appropriate callback ID. As noted above, the flight dataset includes APU runtime data captured in-flight by DAU 108.

Figure 3:
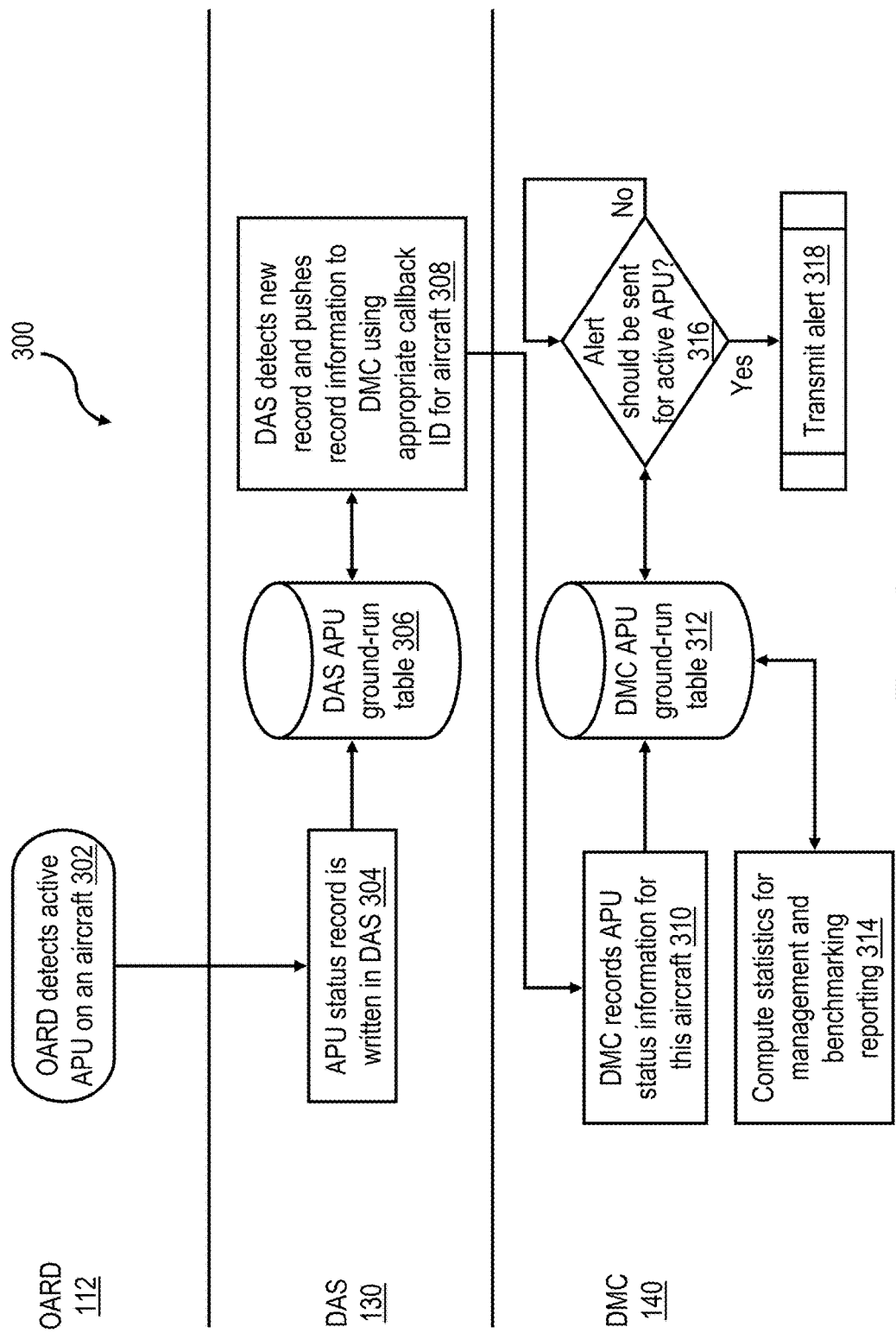
FIG. 3 is a flow diagram of a real-time alerting process according to an example embodiment of the invention.

With reference now to FIG. 3, there is illustrated a flow diagram of a real-time alerting process 300 according to an example embodiment of the invention.

The process depicted in FIG. 3 begins at block 302, which illustrates OARD 112 of aircraft 102 receiving an APU run signal from APU 104 through communication link 122. In response to detection that APU 104 is active or "On" at block 302, OARD 112 transmits and DAS system 130 receives a notification of an operating status change for APU 104. In response to receipt of the notification of the operating status change, DAS system 130 writes an APU status record in a data structure, referred to herein as DAS APU ground-run table 306 (block 304). A reporting process in DAS system 130 detects insertion of the new APU status record in DAS APU ground-run table 306 and, after verifying DAS aircraft table 206 indicates data sharing is authorized for the aircraft 102, pushes the information contained in the APU status record to DMC 308 using the appropriate callback ID for the aircraft (block 308). No data from the APU status record is shared if DAS aircraft table 206 does not authorize data sharing with DMC 308.

In response to receiving from DAS system 130 the information contained in the APU status record, DMC 140 records the APU status information for this aircraft 102 in a record of a DMC data structure referred to herein as DMC APU ground-run table 312 (block 310). As shown at block 314, DMC 140 can utilize the APU status information to generate and/or distribute airline management reports detailing APU usage to authorized users/subscribers. The management reports can provide specific detail regarding APU use at the airline, region, station (e.g., airport), and fleet level. Further, DMC 140 can anonymize (i.e., remove airline and aircraft-specific identifiers from) the APU usage data to provide appropriate APU usage benchmarks for contributing aircraft operators.

As further shown at block 316, real time alerting system 150 of DMC 140 can also periodically (e.g., once per minute) determine based on APU status records entered into DMC APU ground-run table 312 whether or not an alert should be transmitted. If an alert threshold has been satisfied, then DMC 140 transmits an alert (block 318). One embodiment of the alerting process shown at block 318 is depicted in more detail below with reference to FIG. 4.

When an APU 104 is no longer running, as evidenced, for example, by a predefined time interval (e.g., 5 minutes) elapsing without a new APU status record being recorded in DMC APU ground-run table 312, DMC 140 preferably creates a summary record for the ground-run in a APU usage history data structure, and the aircraft 102 is removed from DMC APU ground-run table 312.

Figure 4:
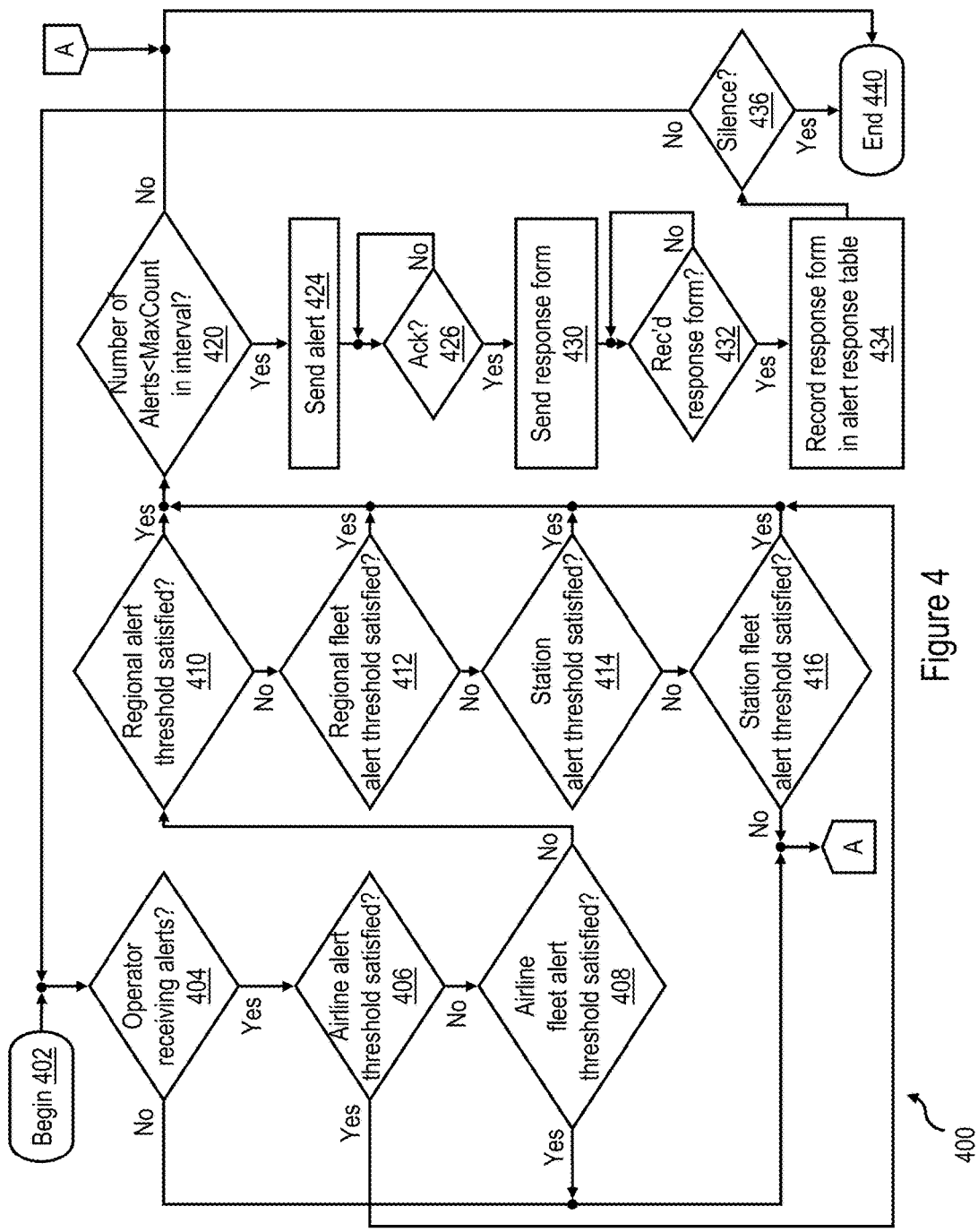
FIG. 4 is a flow diagram of a notification and response process according to an example embodiment of the invention.

Referring now to FIG. 4, there is depicted a flow diagram of a notification and response process 400 according to an example embodiment of the invention.

Process 400 begins at block 402 and then proceeds to block 404, which illustrates DMC 140 determining whether or not DMC 140 is presently configured to provide alerts to an aircraft operator. For example, an authorized user of the aircraft operator can elect to receive alerts (or to opt out of alerts) through a user profile established at block 212 of FIG. 2. If no authorized user associated with the aircraft operator is receiving alerts, the process passes through page connector A and ends at block 440. However, if DMC 140 is configured to provide alerts to at least authorized user of the aircraft operator, the process passes to blocks 406-416.

At blocks 406-416, DMC 140 evaluates the APU usage information reflected in the APU status records of DMC APU ground-run table 312 to determine if one or more APU alert thresholds (e.g., in DMC airline table 214) have been satisfied (e.g., reached and/or exceeded). For example, DMC 140 may evaluate APU usage by airline (block 406), airline fleet (block 408), geographical region (block 410), regional fleet (block 412), aircraft station (block 414), and/or station fleet (block 416). As will be appreciated, these thresholds can be hierarchically arranged.

If DMC 140 determines that none of the defined APU usage thresholds has been satisfied, process 400 passes through page connector A and ends at block 440. However, in response to DMC 140 determining that at least one of the defined APU alert thresholds depicted at blocks 406-416 has been satisfied, the process passes to block 420. Block 420 illustrates DMC 140 checking if the number of alerts provided in the current time interval (e.g., half an hour, hour or day) is less than a maximum number of alerts (i.e., Max-Count), which can be defined, for example, in DMC airline table 214. If the number of alerts already provided in the current time interval is greater than or equal to the Max-Count, the process terminates at block 440. However, if the MaxCount of alerts has not been reached, then DMC 140 transmits an alert (e.g., an email message, text message, automated phone message, and/or a pop-up message in web console 142) to one or more authorized users of the aircraft operator, such as ramp workers or supervisors (block 424). The alert can indicate, for example, indicating the station (e.g., airport), aircraft type, aircraft tail number, and total run time (e.g., number of minutes) for the current APU run. In a preferred embodiment, the alert optionally requests an acknowledgment, for example, by including a link that, if selected, causes an acknowledgment message to be transmitted to DMC 140.

Either in the request for acknowledgement or upon receipt of the acknowledgment from the authorized user, DMC 140 preferably sends the authorized user a response form requesting the user to identify the reason for the APU runtime exceeding the threshold (block 430). In response to the authorized user associated with the aircraft operator responding at block 432 with a completed response form, DMC 140 records the reason for the APU usage specified in the response form in an alert response table (block 434). For example, the response form may be implemented as a webpage requesting the user identify a reason code associated with the reason for the APU runtime exceeding the threshold, such as the lack of available external power, the lack of external ground-based air conditioning equipment, lack of personnel to operate ground equipment, extremely hot outside air temperatures, weather delay, mechanical issue, substitute crewmember delay, or the like. If the authorized user opts to silence alerts at block 436, the process ends at block 440. Otherwise, process 400 returns to block 404 and following blocks, which have been described.

In the embodiment depicted in FIG. 4, alerts are sent only for ground APU data. Typically, APU use is fairly well managed when there are flight crewmembers operating the aircraft. Some minor savings may be possible during times crewmembers are operating the aircraft, and these savings opportunities will be reflected in the flight dataset. So, in one preferred embodiment, DMC 140 only tracks APU ground-run time (i.e., use while the aircraft parked on the ground) for purposes of real time alerting. However, in at least some embodiments, DMC 140 combines the APU usage data from the flight dataset with APU usage data from the ground dataset to produce overall APU usage data. This overall APU usage data can then be used to provide management reporting and benchmarking, as shown at block 148. In at least some embodiments, this overall APU usage data can alternatively or additionally be used in the comparison with APU alert thresholds as described above.

In some cases, the in-flight APU usage data and ground APU usage data received by DAU 108 and OARD 112, respectively, are raw data, which may include, for example, date/time (GMT) and APU off/on status (0/1). If provided in this format, the raw data can be processed to determine the actual APU runtime that is compared by DMC 140 to the APU alert thresholds. The processing of the raw data to determine the actual APU runtime can be performed, for example, by DAS system 130, or alternatively, by DMC 140 or another computer processor (e.g., DAU 108 may determine the in-flight APU runtime).

Figure 5:
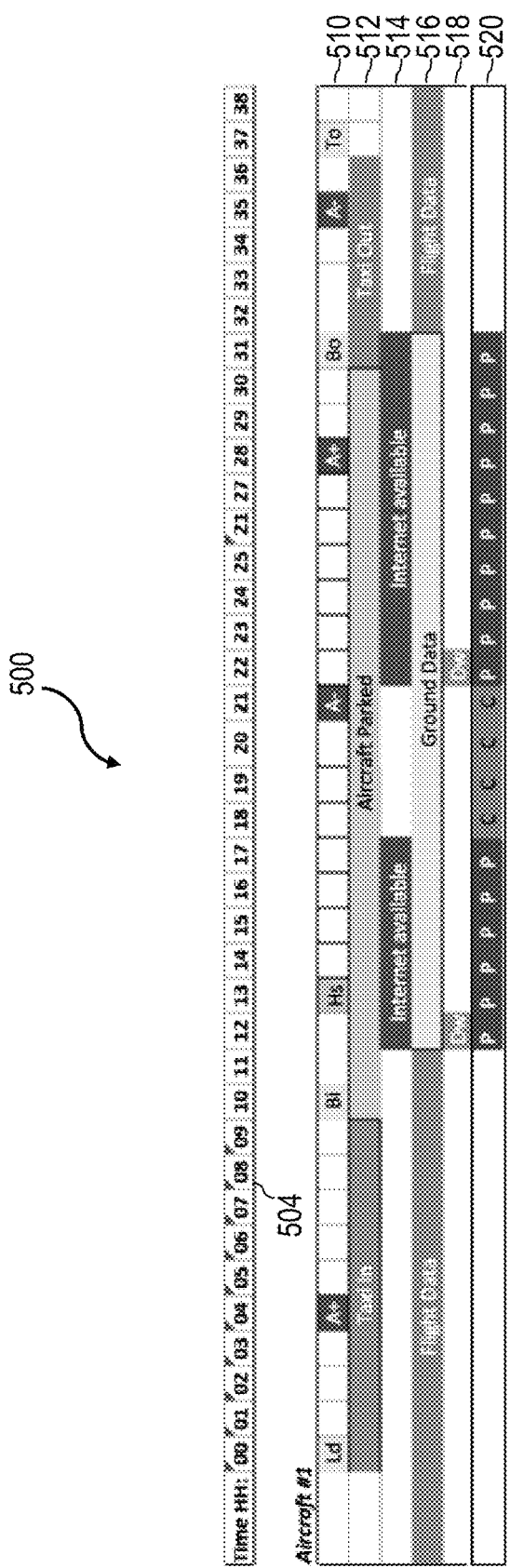
FIG. 5 is an example of an APU usage timeline in accordance with one embodiment of the invention.

FIG. 5 is an example of an APU usage timeline 500 in accordance with one embodiment of the invention. APU usage timeline 500 shows APU usage during an aircraft turnaround and illustrates the integration of APU usage data from the flight dataset and ground dataset to enable full reporting of APU usage.

As shown, APU usage timeline 500 includes an elapsed time indicator 504 indicating elapsed on-ground time in minutes and six timeline bands 510-520 indicating the timings of various events relative to elapsed time indicator 504.

Aircraft event band 510 indicates the timing of various aircraft-related events in the turnaround from landing (at minute 00) to block in (at minute 10) to block out (at minute 31) to subsequent takeoff (at minute 37). In particular, aircraft event band 510 indicates that during this turnaround, operation of the aircraft APU was started at minute 04, stopped at minute 21, restarted at minute 28, and again stopped at minute 35. Ground operation band 512 aligns the events depicted in aircraft event band 510 with various phases of aircraft ground operation, including a "taxi in" phase including minutes 00-09, an "aircraft parked" phase including minutes 10-30, and a "taxi out" phase including minutes 31-36. As indicated by dataset band 516, APU usage is captured in flight dataset 132 through minute 11 (e.g., until just after block in when the main engines are shut down) and following minute 31 (e.g., just after block out when the main engines are restarted) and is captured in ground dataset 134 between minutes 12 and 31.

APU usage timeline 500 additionally further provides information regarding APU usage reporting in timeline bands 514 and 518-520. In particular, connectivity band 514 indicates when wireless connectivity between OARD 112 and DAS system 130 was available, which in this example was between minutes 12 to 17 and again from minutes 22 to 31. Groundlink band 518 shows that a wireless communication link was established between DAS system 130 and OARD 112 at minute 12, and following disconnection at minute 18, was reestablished at minute 22. Data traffic band 520 illustrates that OARD 112 posted real time APU data packets while the wireless communication link between DAS system 130 and OARD 112 was active (e.g., between minutes 12-17 and minutes 22-31) and cached APU data packets for subsequent communication to DAS system 130 while the communication link was down (e.g., during minutes 18-21). It should be appreciated that OARD 112 reports APU usage data from the flight dataset that ended at minute 11 in one or more of the APU data packets (typically the first APU data packet in the sequence) and reports real-time APU ground-use in at least one or more additional APU data packets. As described above, the APU data packets may include information, such as airline designator, aircraft ID (tail number), APU runtime, APU status (on/off), aircraft position (e.g., cell tower ID), and/or the time the main aircraft engines were shut down. Based on the information provided in the APU data packets, DMC 140 can support alerting and reporting based on APU usage detailed in the ground dataset alone and/or based on APU usage contained in both the flight dataset and ground dataset.

As has been described, in at least one embodiment, an on-aircraft recording device includes an interface that receives APU usage data from an aircraft auxiliary power unit (APU) independently of a flight data recorder and data acquisition unit. The on-aircraft recording device can be communicatively coupled (e.g., wirelessly) to a data acquisition service (DAS) system that communicates APU ground-run usage data received from a plurality of on-ground aircraft to a data management center (DMC) utilizing a plurality of unique callback identifiers. The DMC can include a DMC APU ground-run data structure for storing APU ground-run usage data and a processor configured to receive APU ground-run usage data for a plurality of on-ground aircraft, record, in the DMC APU ground-run data structure, the APU ground-run usage data for the plurality of on-ground aircraft, detect if the APU ground-run usage data satisfies an APU usage threshold, and electronically communicate, via a communication network, an alert indicating potentially excessive APU use.

While the invention has been described herein with respect to embodiments for monitoring, analyzing, and reporting usage of APUs on aircraft, adaptations for other applications are contemplated by and within the scope of the invention. For example, the methods, systems, and apparatus disclosed herein can be adapted for monitoring, analyzing, and/or reporting usage of another type of power unit and/or for another type of vessel. Such adapted embodiments can be used on ships or other watercraft, trucks with refrigerated trailers, and/or other vessels with APUs in addition to main/propulsion engines. In such adapted embodiments in which the vessel does not typically include an OARD or other onboard data recording device and the fleet operator does not typically have a DAS system or other system for acquiring data, these can be provided to provide the functionality described herein and considered part of the invention.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences or with parallel steps, unless expressly stated otherwise herein.

While the invention has been shown and described in exemplary forms, it will be apparent to those skilled in the art that many modifications, additions, and deletions can be made therein without departing from the spirit and scope of the invention as defined by the following claims. For example, although aspects have been described with respect to a data processing system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

What is claimed is:

1. A data management center (DMC), comprising:
   data storage including a DMC auxiliary power unit (APU) ground-run data structure for storing APU ground-run usage data;
   a processor configured to:
   receive APU ground-run usage data for a plurality of on-ground aircraft;
   record, in the DMC APU ground-run data structure, the APU ground-run usage data for the plurality of on-ground aircraft;
   detect if the APU ground-run usage data satisfies an APU usage threshold; and
   electronically communicate, via a communication network, an alert indicating potentially excessive APU use.

2. A system comprising:
   the data management center (DMC) of claim 1, wherein the processor is a first processor and the data storage is first data storage; and
   an on-aircraft recording device, including:
   a first interface that receives a flight dataset including APU usage data from at least one of a flight data recorder and a data acquisition unit;
   a second interface that receives a ground dataset including APU usage data from a APU independently of the flight data recorder and data acquisition unit;
   a storage device; and
   a second processor coupled to the storage device and configured to record the APU usage data received from the APU via the second interface on the storage device.

3. The system of claim 2, wherein the second processor is further configured to record both the flight dataset and the ground dataset on the storage device.

4. The system of claim 2, and further comprising at least one of the flight data recorder and the data acquisition unit.

5. The system of claim 2, and further comprising an auxiliary power unit (APU), wherein the APU includes a first interface communicatively coupled to the data acquisition unit and a second interface communicatively coupled to the on-aircraft recording device.

6. The system of claim 2, and further comprising:
   a data acquisition service (DAS) system communicatively coupled to the on-aircraft recording device, wherein the DAS system includes:
   second data storage including a DAS aircraft data structure; and
   a third processor coupled to the second data storage, wherein the third processor is configured to:
   record, in the DAS aircraft data structure, identifiers of a plurality of on-ground aircraft for which APU ground-run usage data is authorized to be forwarded to the data management center (DMC);
update the DAS aircraft data structure to associate a respective one of a plurality of unique callback identifiers with each of the plurality of identifiers; and
communicate APU ground-run usage data received from the on-aircraft recording device to the data management center (DMC) utilizing one of the plurality of unique callback identifiers.

7. A system, comprising:
the data management center (DMC) of claim 1, wherein the processor is a first processor and the data storage is first data storage;
a data acquisition service (DAS) system, including comprising:
second data storage including a DAS aircraft data structure;
a second processor coupled to the second data storage, wherein the second processor is configured to:
record, in the DAS aircraft data structure, identifiers of a plurality of on-ground aircraft for which APU ground-run usage data is authorized to be forwarded to the data management center (DMC);
update the DAS aircraft data structure to associate a respective one of a plurality of unique callback identifiers with each of the plurality of identifiers; and
communicate APU ground-run usage data received from the plurality of on-ground aircraft to the data management center (DMC) utilizing the plurality of unique callback identifiers.

8. The data acquisition service (DAS) system of claim 7, wherein:
the second data storage includes a DAS auxiliary power unit (APU) ground-run data structure; and
the second processor is further configured to store the APU usage data in the DAS APU ground-run data structure.

9. The data management center (DMC) of claim 1, wherein:
the data storage further includes a DMC airline data structure; and
the processor is further configured to establish, in the DMA airline data structure, the APU usage threshold in response to a user input.

10. The data management center (DMC) of claim 1, wherein:
the APU usage threshold is an aggregate APU usage threshold for APU usage of multiple of the plurality of on-ground aircraft.

11. The data management center (DMC) of claim 1, wherein:
the APU usage threshold is defined solely for APU ground-run usage.

12. The data management center (DMC) of claim 1, wherein:
the processor is further configured to record in the data storage a user-supplied reason for the potentially excessive APU use.

* * * * *